United States Patent [19]

Bernotavicz

[11] 4,143,168

[45] Mar. 6, 1979

[54] SHAPED BLOOD BY-PRODUCT AND PROCESS

[75] Inventor: John W. Bernotavicz, Hanover Park, Ill.

[73] Assignee: The Quaker Oats Company, Chicago, Ill.

[21] Appl. No.: 777,585

[22] Filed: Mar. 15, 1977

Related U.S. Application Data

[63] Continuation of Ser. No. 638,685, Dec. 8, 1975, abandoned.

[51] Int. Cl.² .............................................. A23K 1/04
[52] U.S. Cl. .................................. 426/266; 426/657; 426/805; 426/647
[58] Field of Search ................ 426/647, 657, 264–266, 426/805

[56] References Cited

U.S. PATENT DOCUMENTS

| 190,472 | 5/1877 | Cragin | 426/647 |
| 658,021 | 9/1900 | Richter | 426/657 |
| 2,241,868 | 5/1941 | Reimann | 426/647 |
| 3,645,747 | 2/1972 | Palmer | 426/647 |

FOREIGN PATENT DOCUMENTS

1153135  5/1969  United Kingdom ..................... 426/647

*Primary Examiner*—Jeanette M. Hunter
*Attorney, Agent, or Firm*—Charles J. Hunter; Mathew R. P. Perrone, Jr.

[57] ABSTRACT

Blood chunks are prepared by combining blood with at least one gum and other optional food materials heated and divided into solid meat by-product type ingredient for use in a pet moist food.

19 Claims, No Drawings

SHAPED BLOOD BY-PRODUCT AND PROCESS

CROSS REFERENCE TO RELATED APPLICATIONS

This application is a continuation of U.S. patent application Ser. No. 638,685, filed Dec. 8, 1975, now abandoned.

BACKGROUND OF THE INVENTION

This invention relates to foods and more particularly to the use of at least one gum and other optional food ingredient materials to provide a firmer, cutable, solid blood product for use in canned commercial pet food products.

Within the class of pet foods, there are three basic subdivisions — dry pet foods, semi-moist pet food, and moist pet food. Dry pet food is the most stable pet food and requires the least sophisticated packaging. However, the dry pet food is less palatable than the other classes of pet foods. The semi-moist pet food requires somewhat more sophisticated packaging than dry pet food, but is more palatable than the dry pet food. The moist pet food is the most palatable of the three classes, but requires the most sophisticated packaging. The moist pet food is the canned commercial pet food. Additionally, the moist pet food after removal from the package, must be refrigerated in order to be preserved against microbiological and bacteriological degradation.

Currently, liquid citrated blood is added to commercial moist pet foods at the level of 1-5% of the formula. Blood is a suitable component for such use because it contributes a high percentage of protein, and supplements the color, odor, flavor and nutrients of a canned pet food. However, when high levels (above 5%) of citrated or liquid blood are used, the moist pet food becomes a food with a dark, unappetizing color with a corresponding effect on odor and flavor.

These detrimental features permit no high percentage usage of blood in commercial moist pet foods. Yet, blood is a readily available material, because there are not enough uses for the blood that is available. Due to this availability, it is an economical source of protein in ample supply. It is also palatable and has very little fat. If a means can be found for using greater quantities of blood in commercial moist pet foods, the advantages of blood can be put to their best use.

Sodium citrate or citric acid is added to fresh blood to prevent its coagulation. Blood is nitrated to hold its color. Neither of these additions affects the protein content of blood which averages about 17.6% protein and 81% water. This nutrient level compares very favorably with other meat or meat by-products used in pet food formulations. for example, the following ingredients show the following percentage of protein:

Pork lungs 12.9% Protein Average;
Beef hearts 13.6% Protein Average;
Beef spleens 17.1% Protein Average;
Beef gullets 12.5% Protein Average
on an as is basis.

Fresh blood or frozen blood or citrated blood or nitrated blood is easily clotted into a very fragile friable, porous and brittle coagulum through the use of heat or chemical reactions. When such a coagulated product is added as an ingredient to a conventional pet food formulation, it disintegrates and shatters during the sterilization process. Any form of agitation during this cooking process further enhances the breakup of this clot ingredient. As such, the blood becomes unsuitable for pet food use.

It is, therefore, desirable to provide a stable blood component for use in a moist pet food.

SUMMARY OF THE INVENTION

Therefore, it is an object of this invention to provide a firmer solid blood product for use in a moist pet food.

It is further an object of this invention to provide an improved blood product for use in a moist pet food.

It is a still further object of this invention to provide an improved blood product having an enhanced and/or added flavor.

Yet a further object of this invention is to provide an improved blood product having an enhanced odor.

Also an object of this invention is to provide an improved blood product having enhanced and supplemented nutritive properties.

Still another object of this invention is to provide a moist pet food containing an improved solid blood product.

Yet another object of this invention is to provide a moist pet food having improved flavor.

A further object of this invention is to provide a moist pet food having improved odor.

A still further object of this invention is to provide a moist pet food having improved nutritive properties.

Also an object of this invention is to provide an improved process for stabilizing blood for use in pet foods.

Another object of this invention is to provide an improved process for enhancing and supplementing the flavor of blood.

Yet another object of this invention is to provide an improved process for enhancing and supplementing the odor of blood.

A further object of this invention is to provide an improved process for enhancing and supplementing the nutritive properties of blood.

These and other objects of the invention are met by providing a blood and at least one gum in combination with other food materials for use in a pet food.

DESCRIPTION OF THE PREFERRED EMBODIMENTS

Blood stabilized with at least one gum and/or other food materials is incorporated into a moist pet food to provide enhanced flavor, and nutritive properties. These other food materials are optional and can be employed in formulating the solid blood if desired. Typical other food materials optionally used in the blood and gum product include additional animal protein sources such as meat and meat by-products, and egg solids; vegetable protein sources such as wheat gluten, and soy flour; torula yeast, amylaceous ingredients, sugars, fats, vitamin and mineral supplements, iron oxides, processing aids, mold inhibitors, antioxidants, glycol, flavors, or emulsifiers; and mixtures thereof.

By blood is meant the blood of slaughtered animals. Typical slaughtered animals include cattle, swine, sheep, goats, horses, whale and other mammals as well as poultry and fish. The preferred blood for use in this invention is beef blood, because of its availability (approximately 35 pounds of blood can be obtained from a 1000 pound steer). In this application, liquid blood usage varies from 45% to 99.4% depending on whether other food ingredients like cheese, meat and meat by-products, fish or just gum systems are used to produce a firm particle. The various types of blood are used singly or in any reasonable combination.

Added to the above-referenced blood to form the desired solidified product is at least one gum. As the upper level of gum increases, the corresponding upper level of blood decreases. Such gum is generally present in an amount up to about 3% by weight of the blood. More preferably, the gum is present in an amount 0.1 to 2% and even more preferably 0.2 to 0.8% by weight of the blood. Most preferably, the gum is present at about 0.3% to about 0.6% by weight of the blood. By "up to" is meant, throughout the specification, at least a trace amount of the ingredient is present for the lower level, when no lower level is otherwise specifically stated.

As above stated, the blood and gum are the only necessary elements for forming a solid blood chunk stable under moist pet food canning conditions. It is, however, possible to modify the blood chunk by adding other ingredients. When these other ingredients are added, the amount of blood in the chunk is correspondingly reduced. These other ingredients are in the blood chunk when formed if added prior to solidifying the blood. Improved texture of the solidified blood results when small amounts of at least one required gum are added to the blood together with these optional materials. When blood is solidified into an ingredient with a firm stable texture by adding the gum with or without the optional ingredients, it can be added to many types of pet foods, e.g. as chunks in a canned pet food.

Typical gums suitable for use in this invention include the gums listed in U.S. Pat. No. 2,999,018 to Huffman, et al. More specifically, the gums can be one selected from the group consisting of xanthan gum, locust bean gum, agar agar, guar gum, sodium carboxymethylcellulose, carrageenan, alginate gums or any mixtures thereof.

The addition of the gums to the blood permits the addition of other ingredients to the blood in order to enhance and supplement the appearance, texture, flavor, odor, and nutritive properties of the resulting solidified blood particle. Other optional, suitable ingredients which can be incorporated with the blood of this invention include at least one protein source, at least one amylaceous ingredient, at least one sugar, at least one fat or oil, at least one vitamin or mineral supplement, various other additives selected from the group consisting of colorings, flavors, emulsifier, antioxidants, and water absorbers, and mixtures thereof.

The additional and optional protein source can be animal or vegetable protein sources or mixtures thereof. Meats as a source of animal protein include the flesh of cattle, swine, sheep, goats, horses, whale and other mammals, poultry and fish. Another protein source is a meat by-product. By meat by-products is meant those things shown in the 1975 Association of American Feed Control Officials, Inc. under No. 9 Animal Products, 9.3 page 70 which says meat by-products are the non-rendered clean wholesome parts other than meat derived from slaughtered animals. Meat by-products include but are not limited to lungs, spleens, kidneys, brains, livers, blood, bone, partially defatted fatty tissue using either a low temperature or a high temperature process, and stomachs and intestines freed of their contents. If it bears a name descriptive of its kind, it must correspond thereto, (Proposal 1973, Adopted 1974 — NRC5-00-395). Animal protein also includes such materials as animal liver meal, animal liver ad glandular meal, extracted animal liver meal, animal liver and glandular meal, extracted animal liver meal, whale meal, meat and bone meal, animal by-product meal, dried meat solubles, meat meal, fish meal, fish protein concentrate, poultry parts, poultry by-products, poultry by-product meal, blood meal, milk products and egg products.

Typical vegetable protein sources are obtained from the oil seed proteins such as soybean, peanut and cottonseed. These oil seed proteins are usable in the meal, concentrate, isolate, or flour form. Also, mixtures of these ingredients may be used in a formula with blood. Other vegetable protein sources are obtained from oats and corn and wheat. Typical corn sources include corn germ, corn gluten feed, corn gluten meal, corn distillers dried grain, and dried corn distillers solubles. Typical wheat protein sources include wheat gluten, wheat germ and wheat germ meal. Especially suitable is up to 5% vital wheat gluten. The above referenced vegetable proteins are modifiable by acid, base, or enzymatic hydrolysis thereof. A further suitable protein source includes yeast such as torula yeast, brewers yeast and yeast concentrates. Mixtures of the referenced protein sources are also suitable.

Blood chunks as described in this invention can contain these other protein sources in amounts up to 50% of the formula when these ingredients are finely comminuted for proper suspension and dispersion in citrated beef blood formulations or other blood compositions. Gum systems are used to produce this result. The level of animal, fish, chicken, or other additives is dependent upon desired features such as flavor. More preferably, the amount of the alternate protein source is up to 25% also 0 to 5% vegetable protein may be used in the chunk.

The following different food additives illustrate the diverse characteristics in these ingredients and yet show compatibility when used in fresh, frozen, nitrated or citrated blood chunks. For example, the amylaceous ingredients are present up to about 4% and exemplified by pregelatinized corn starch or tapioca starch; flavors are represented by imitation chicken, liver or kidney in sufficient amounts; and iron oxide is a typical coloring material in sufficient amounts. The sugars for use herein are well defined in the patent to Burgess, et al., U.S. Pat. No. 3,202,514. Emulsifiers include mono and diglycerides. Typical animal fats or oils include prime steam lard, lard, tallow and choice white grease or stable vegetable oils. Typical mold inhibitors include the antimycotics such as potassium sorbate and other known mold inhibitors in sufficient amounts. Typical preservatives such as polyhydric components include those listed in U.S. Pat. No. 3,759,714 to Burkwall and especially propylene glycol, butane diol or mixtures thereof. All patents referenced herein are incorporated by reference. The additives above-listed are present in sufficient amounts and do not cause disintegration of the blood chunk even when processed under commercial pet food processing conditions. The sufficient amounts are effective amounts which are easily determined by a person having ordinary skill in the art.

When other ingredients are added beyond blood and gum to make a blood chunk a processing aid is sometimes needed to avoid stickiness. Typically, such needs are easily determined by a person having ordinary skill in the art. Generally speaking up to about 10% of a processing aid is suitable for use in this invention. An especially suitable processing aid is a non-functional inert cellulose. Such a cellulose is typified by alpha cellulose.

Separate procedures are used in preparing components of the solidified blood. Generally speaking the dry ingredients are sifted to eliminate extraneous matter. Liquid is examined visually and sieved if necessary. All ingredients that are in bulk are ground and homogenized. The ingredients may be cooked or commercially sterilized for ease of handling and prevention of auto-oxidation or deterioration. If the blood cubes are to be prepared in advance and stored in anticipation of additional handling, the coagulated mixture is customarily cooled before cutting into appropriate chunk size.

Once the dry and liquid material, if any, are dispersed into the solution of blood, the mixture is heated in a water bath at temperatures from 150°–200° F. for 20–60 minutes or until adequately coagulated. The preferred time is about 40 minutes at a temperature of about 180° F.

Specific gum usage levels can vary with additives and various blends but generally showed the following results:

(a) Carrageenan is effective in firming a blood clot in the ranges from 0.3% to 1.0% and the preferred level is the 0.7% level.

(b) Sodium carboxymethylcellulose is evaluated to produce a firm blood clot when added at levels ranging from 0.25% to 3% with the preferred level at 0.75–1.25%.

(c) Xanthan gum is enhanced by the addition of calcium citrate. The xanthan gum is used up to 1.4% and is preferably in 7 parts by weight xanthan gum to 1 part by weight calcium citrate.

(d) Locust bean gum and agar agar are effective in ranges of from 0.2% plus 0.2% respectively to 0.6% plus 0.6% respectively with preferred range being 0.3% locust bean gum plus 0.3% agar agar.

(e) Locust bean and xanthan gum mixtures are effective in ranges of from 0.2% plus 0.2% to 0.6% plus 0.6% respectively with the preferred range being a mixture of 0.4% locust bean gum and 0.4% xanthan gum.

Any size or shape for the chunk is suitable as long as the chunk is visible in a product. A suitable volume for the chunk is up to about 1.5 cubic centimeters. A more suitable volume is up to about one cubic centimeter. The most suitable volume is up to about 0.75 cubic centimeter. These suitable volumes vary with use, and based on this disclosure are determined by standard methods. A typical shape is a cube.

The blood chunk made by the process of this invention is suitable for use in a canned pet food because it does not disintegrate under canning conditions and retains its structure. A typical generic canned dog food has a moisture content in excess of 50% comprises the ingredients listed in Table 1.

TABLE 1

| Formula for canned dog food | |
|---|---|
| Ingredient | Percent |
| Animal products | 15–30 |
| Poultry parts | 1–20 |
| Ground bone | 4–16 |
| Vegetable products | 10–20 |
| Iodized salt | 0.8–1 |
| Flavoring aids | 0–0.5 |
| Onion powder | 0.05 |
| Garlic powder | 0.01 |
| Vitamin mix | 0.03–0.06 |
| Iron oxide | 0.001–0.1 |
| FD&C Red #3 | 0.0001–0.01 |

TABLE 1-continued

| Formula for canned dog food | |
|---|---|
| Ingredient | Percent |
| Water sufficient for processing | 0–80 |

A typical canned cat food has a moisture content in excess of 50% and comprises the ingredients listed in Table 2.

TABLE 2

| Formula for canned cat foods | |
|---|---|
| Ingredient | Percent |
| Animal products | 15–30 |
| Fish | 5–10 |
| Poultry products | 2–12 |
| Ground bone | 5–10 |
| Vegetable products | 12–16 |
| Iodized salt | 0.3 |
| Organic acid | 0.2 |
| Vitamin mix | 0.4 |
| Flavoring aids | 0.03 |
| Enzyme activity | 0.002 |
| Antioxidant | 0.01 |
| Sodium nitrite | 0.01 |
| Water, for processing | |

These canned food formulas or moist pet food formulas may have therein up to 50% blood chunks by weight of the canned pet food. More preferred is 20% to 40% blood chunks. Most preferred is 25% to 35% blood chunks by weight of the canned pet food.

Having thus fully described the invention, the following examples are presented to illustrate without unduly limiting the invention. Unless otherwise specified, all parts and percentages in the several examples and throughout the specification are by weight of the solidified blood.

EXAMPLE 1

One process suggested to transform liquid citrated beef blood to a firm solid chunk is as follows.

At least one gum is added to liquid blood using adequate techniques to guarantee dispersion and prevent clumping by blending with other ingredients or with adequate agitation as shown below, such as a standard mixer:

a. 99.2% Liquid citrated or nitrated or fresh beef blood
   0.7% Xanthan gum (dry)
   0.1% Calcium citrate (dry)
b. 98.75–99.25% Liquid citrated or nitrated or fresh beef blood
   0.75–1.25% Sodium carboxymethylcellulose (dry)
c. 99.3% Liquid citrated or nitrated or fresh beef blood
   0.7% Carrageenan gum (dry)
d. 99.4% Liquid citrated or nitrated or fresh beef blood
   0.3% Locust bean gum (dry)
   0.3% Agar agar (dry)

In each case a suitable solid beef blood chunk is obtained upon cooking of each of the above mixtures.

EXAMPLE 2

The procedure of Example 1 is repeated using the ingredients listed below with good results, provided however the additional ingredients beyond blood and gum are treated as follows.

1. All dry ingredients are sieved to eliminate extraneous material, as necessary.

2. All solid ingredients are ground and homogenized.
3. The fresh or frozen by-products are cooked and/or commercially sterilized to inactivate any enzyme action, to help in dispersion during the blending with blood, and to prevent deterioration in the finished blood cubes when they are prepared and stored in advance of any usage.

a.)

| Fresh, frozen, nitrated or citrated beef blood | 94 % |
| Animal fat | 1.9% |
| Egg Powder | 1.0% |
| Alpha Cellulose | 1. % |
| Torula Yeast | 1. % |
| Sodium carboxymethyl-cellulose | .6% |
| Food phosphate | .5% | b.)

| Fresh, frozen, nitrated or citrated beef blood | 85.2% |
| Soy flour | 5. % |
| Egg powder | 5. % |
| Alpha Cellulose | 2. % |
| Torula Yeast | 1.5% |
| Vegetable oil | 1.0% |
| Xanthan gum | .3% | c.)

| Fresh, frozen, nitrated Citrated beef blood | 88.6% |
| Alpha cellulose | 10.0% |
| Sodium carboxymethyl-cellulose/Carrageenan | |
| Xanthan gum | 1.4% | d.)

| fresh, frozen, nitrated citrated beef blood | 51.2% |
| Whole cooked ground flounder | 48.0% |
| Xanthan gum | .4% |
| Locust bean gum | .4% | e.)

| Citrated beef blood | 65.2% |
| Egg powder | 11. % |
| Cheddar cheese | 11 % |
| Ground cooked Flounder | 11 % |
| Onion soup | 1. % |
| Locust bean gum | .4% |
| Xanthan gum | .4% | f.)

| Fresh, frozen nitrated or citrated beef blood | 45 % |
| Cooked beef intestines | 35 % |
| Cooked pork lungs | 15 % |
| Starch | 1.3% |
| Torula yeast | 1.0% |
| Alpha cellulose | 1.0% |
| Egg powder | .5% |
| Onion oleoresin | .5% |
| Locust bean gum | .3% |
| Agar agar | .3% |
| Food phosphate | .1% |

EXAMPLE 3

The indicated process below is also accomplished with the following ingredients with 0.25% gum system of sodium carboxymethylcellulose and Xanthan gum, or a locust bean gum and agar:

1. All dry ingredients are treated to contain no extraneous materials, and then sieved and ground to a powder as required.
2. Gums, vital wheat gluten, pregelatinized starch, and other ingredients are added to liquid citrated blood. The components are stirred and cooked at 180° F. for 40 minutes in a water bath or equivalent type system until solidified.
3. The product is then cooled and cubed into proper size chunks for addition to canned or gravy pet foods.

| (a) Fresh, frozen, nitrated or citrated beef blood | 95 % |
| Wheat gluten | 4.75 % |
| Sodium carboxymethyl-cellulose | .25 % |
| (b) Fresh, frozen, nitrated or nitrated beef blood | 95.75 % |
| Pregelatinized corn flour | 4.0 % |
| Xanthan gum | .25 % |
| (c) Fresh, frozen, nitrated or citrated beef blood | 95.60 % |
| Pregelatinized tapioca | 4.0 % |
| Locust bean gum | .2 % |
| Agar agar | .2 % |

In each case a suitable solid blood chunk is obtained.

EXAMPLE 4

Beef citrated blood can be stabilized with any of the gums systems indicated above (carrageenan, xanthan gum with calcium citrate, sodium carboxymethylcellulose, locust bean gum and agar agar mixtures etc.) and is miscible with such ingredients as mold inhibitors, humectants, and antioxidants as shown below:

Process

1. Liquids are weighed separately.
2. Dry ingredients are weighed and blended together.
3. Liquids are stirred into blood using a magnetic stirring rod or its equivalent. Dry ingredients are added slowly to prevent lumping.
4. The stirrer is removed and filled containers are placed in a water bath, heated at 180° F. for 40 minutes, and then cooled, and the product is cubed to 0.75 cubic centimeter.

The following ingredients are used to make a suitable blood chunk:

Formula

| Fresh, frozen, nitrated or citrated beef blood | 94.5 |
| Xanthan gum | 0.7 |
| Calcium citrate | 0.1 |
| Potassium sorbate | .3 |
| Calcium proprionate | .1 |
| Sodium benzoate | .1 |
| Propylene glycol | 4.0 |
| Tenox 6* | .05 |
| Ethoxyquin | .15 |

*Tenox 6 is an Eastman Chemicals Products Trademark having the composition:

| | % by weight of Tenox 6 |
|---|---|
| Butylated hydroxyanisole | 10. |
| Butylated hydroxytoluene | 10. |
| Propyl Gallate | 6. |
| Citric Acid | 6. |
| Propylene Glycol | 12. |
| Corn Oil | 28. |
| Glycerol Monoleate | 28. |

Having thus fully described the invention, what is claimed and sought to be secured by letters patent of the United States is:

1. A solidified blood chunk suitable for use in a canned pet food consisting essentially of blood and gum wherein the blood is at least one selected from the group consisting of fresh blood, frozen blood, citrated blood, and nitrated blood and the gum is present in an amount sufficient to form a solid blood chunk stable under moist pet food canning conditions and is from 0.1 to 3 percent of at least one gum based on the weight of the blood, wherein the blood comprises the balance of the chunk.

2. The solidified blood chunk of claim 1 wherein the gum is selected from the group consisting of xanthan gum, locust bean gum, carboxymethylcellulose, and a carrageenan product.

3. The solidified blood chunk of claim 2 wherein the blood is fresh, frozen, citrated or nitrated beef blood.

4. The solidified blood chunk of claim 3 wherein the beef blood is citrated or nitrated.

5. The solidified blood chunk of claim 1 being divided into chunks having a volume up to 1.5 cubic centimeters.

6. The solidified blood chunk of claim 1 wherein the gum is present at 0.3 percent to 0.6 percent.

7. The solidified blood chunk of claim 1 wherein the gum comprises 0.3 percent to 1.0 percent carrageenan.

8. The solidified blood chunk of claim 1 wherein the gum comprises 0.25 percent to 3.0 percent sodium carboxymethylcellulose.

9. The solidified blood chunk of claim 1 wherein the gum consists essentially of from a trace to 1.4 percent xanthan gum, and the blood chunk further consists essentially of calcium citrate at a ratio of 7 parts by weight xanthan gum to 1 part calcium citrate.

10. The solidified blood chunk of claim 1 wherein the gum is a mixture of 0.2 percent to 0.6 percent locust bean gum and 0.2 percent to 0.6 percent xanthan gum.

11. A process of solidifying blood to form blood chunks consisting essentially of blood and gum wherein the blood is at least one selected from the group consisting of fresh blood, frozen blood, citrated blood, and nitrated blood, and the gum is present in an amount sufficient to form a solid blood chunk stable under moist pet food canning conditions and is from 0.1 to 3 percent of at least one gum based on the weight of the chunk wherein the blood comprises the balance of the chunk comprising:
(a) adding to the blood at least one gum to form a mixture;
(b) solidifying the blood and gum mixture by heating the mixture at a temperature of from 150° to 200° F. until the mixture is coagulated;
(c) cooling the solidified blood and gum mixture;
(d) dividing the cooled blood into chunks; and
(e) recovering the blood chunks.

12. The process of claim 11 wherein the gum is present up to about 2 percent by weight of the blood.

13. The process of claim 12 wherein the gum is at least one selected from the group consisting of xanthan gum, guar gum, locust bean gum, carboxymethylcellulose, and a carrageenan product.

14. The process of claim 13 wherein the blood is beef blood.

15. The process of claim 14 wherein the beef blood is citrated.

16. In a moist pet food, the improvement comprising the moist pet food having incorporated therein solidified blood chunks wherein each chunk consists essentially of blood and gum and wherein the blood is at least one selected from the group consisting of fresh blood, frozen blood, citrated blood, and nitrated blood, and the gum is present in an amount sufficient to form a solid blood chunk stable under moist pet food canning conditions and is from 0.1 to 3 percent of at least one gum based on the weight of the chunk, wherein the blood comprises the balance of the chunk.

17. The moist pet food of claim 16 wherein the gum is at least one selected from the group consisting of xanthan, locust bean, guar, carboxymethylcellulose, and a carrageenan product.

18. The moist pet food of claim 17 wherein the blood is beef blood.

19. The moist pet food of claim 18 wherein the beef blood is citrated.

* * * * *